Oct. 29, 1968

C. R. SMITH ETAL 3,407,858

CUTTER DRIVE AND MOUNTING

Filed Sept. 12, 1966

INVENTOR.
CHARLES R. SMITH &
LLOYD D. SLAGELL.
BY
Harbaugh & Thomas
ATTYS.

3,407,858
CUTTER DRIVE AND MOUNTING
Charles R. Smith, Groveland, and Lloyd D. Slagell, Peoria, Ill., assignors to Creve Coeur Mfg. Co., Peoria, Ill., a corporation of Illinois
Filed Sept. 12, 1966, Ser. No. 578,612
10 Claims. (Cl. 146—76)

This invention relates to centrifugal devices and more particularly to a drive and self-balancing mount for high speed rotary parts of centrifugal machines which may be out of balance either initially or momentarily by the work load.

High speed rotary machines, such as macerators, juice extractors, grinders and centrifuges, although extensively engineered, are subject to vibration due to the development of varying working imbalance in the principle moving or working parts either because of wear or the accumulation of uneven masses of material or cuttings thereon from the work piece or material being treated. This problem is acute in those machines which operate at speeds of 2000 or more revolutions per minute and which are constructed to be dismantled for ready and repeated cleanings. Although various forms of mountings are used in the art both for the whole machine as a unit including the high speed moving parts, these constructions are often expensive and do not always satisfactorily reduce vibration caused by imbalance of the work loads. Also it is imperative that machines used to treat food products such as macerators and juice extractors or centrifuges, be of simple design and easily dismantled and assembled for periodic cleaning, inspection and adjustment of the parts.

The instant invention is directed to the provision of a drive and mounting for the working parts of high speed rotary machines which overcomes or mitigates the problem of vibration, is of simple and inexpensive design and is readily dismantled, easily cleaned and requires no adjustment of the parts on re-assembly. More specifically, this invention relates to the use of certain resilient inserts between the high speed principal moving parts and the drive means ind including resiliently biasing the moving parts with respect to one another.

The primary object of this invention is to provide a simple, practical and effective drive and mount for the working elements of a high speed rotary machine.

An object of this invention is to provide certain improvements in the drive and mounts for high speed centrifugal devices whereby vibration due to working imbalance is prevented.

Another object of this invention is to proivde a fixed resilient insert or sleeve between the drive shaft and centrifugal hub carried thereby, in combination with friction means resiliently biasing the working element to the drive or inertia hub whereby these parts nullify vibration under working conditions.

A further object of this invention is to provide a cutter drive and mounting for a vegetable juicing machine including means to allow the high speed parts to cant out of the normal plane of rotation at a point diametrically opposite an imbalance, cut deeper into the material being treated and automatically remedy the imbalance through increased centrifugal cuttings proportional thereto.

Other objects and advantages of this invention will be described in the specification, reference being made to the drawings for illustration only, without limitation of the invention, wherein.

Figure 1:
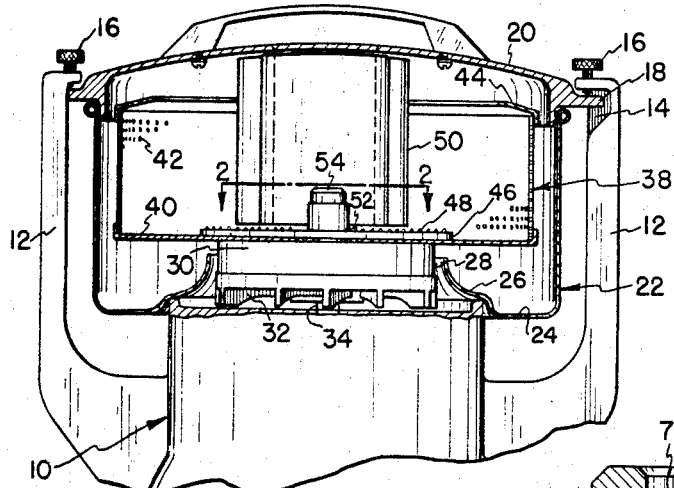
FIG. 1 is a partial side elevation view of a vegetable juicing machine incorporating the improvements of this invention.

Referring in detail to FIG. 1, there is shown a vegetable shredder and centrifugal juice extracting device incorporating the drive and mounting of this invention as an illustration, wherein a base housing member 10 supports a drive motor (not shown), including the necessary electrical conduit and switch for its operation. The lower portion of the housing 10 is conventionally equipped with rubber foot elements (not shown) or equivalent devices to support the device on a horizontal surface with some resilient movement. A pair of oppositely disposed side supports 12 extend upwardly from housing 10, and have oppositely facing recesses 14 bearing thumb screws 16 thereabove designed to secure the radial ears 18 of the removable cover member 20. In its secured position the cover member 20 fits over the top of and closes the vessel 22, forming an enclosure to catch the juices produced by the device.

The vessel 22 is removable and has a circumferential trough bottom 24 into which the juices collect for removal through a downwardly depending spout (not shown) communicating with the trough. The inner wall of the trough bottom 24 is defined by an up-turned flange 26 having a central opening 28 to receive a dynamically balanced hub member 30 which is subjected to both centrifugal and inertia forces. The flange 26 is slightly offset as shown to provide a retaining surface which engages and rests upon the upper edge of the housing 10. The hub 30 has a plurality of radial vanes 32 on its under side and is mounted for rotation with the drive shaft 34 connected in turn to the drive motor mounted within housing 10. The upper edge of housing 10, as well as the bottom of the device are provided with pasageways (not shown) for the forced circulation of air by the vanes around the motor parts.

The hub 30 and shaft 34 carry a conventional basket 38 having a bottom wall 40 and perforated cylindrical side wall 42 with an open top rim 44. The basket 38 is adapted to retain the macerated fibers from the vegetables and allow the juices therefrom to pass through the perforated wall 42 into vessel 22. If desired, an elongated filter paper or fibrous mat can be placed against the inside of the wall 42 to catch the finer vegetable or other types of pulp produced by the juicer.

A macerator disc 46 having a plurality of substantially radially arranged macerating teeth 48 is mounted on the shaft 34 contiguous to the bottom wall 40. The cover 20 has a vegetable feeding guide tube 50 which is open at the top and extends downwardly into the basket 38. The lower open end of the guide tube 50 is closely spaced from the macerating disc 46 at an off-center point in registry with the pattern of the teeth 48 on the macerating disc. A drive means represented by a pin 52, drive-fitted in place, extends from the hub 30 through apertures in both the bottom wall 40 and the macerating disc 42 to hold all three and particularly the wall and disc in rotational relationship therewith as will be described in more detail in connection with FIGS. 2 and 3. This assembly is held together by means of the cap member or lead nut 54 which threadably engages the end of the shaft 34. Thus, the rotation of the shaft 34 causes the hub 30, the basket 38, the macerator disc 46 and the cap member 54 to rotate, which parts constitute the principal elements subjected to imbalance during use of the machine.

The device is readily assembled and disassembled. Removal of the cover 20 is accomplished merely by loosening the thumb screws 16, turning the cover 20 clockwise to clear the ears 18 therefrom and raising the cover from the device. By unscrewing the cap 54 the macerator disc can be lifted from the shaft end and the pin 52 along with the basket 38. This allows removal of the vessel 22. All parts are made of corrosion resistant metal and are fabricated with smooth surfaces and rounded corners to exclude undesired accumulations of food particles.

It is apparent that the introduction of vegetables through the feed guide tube brings them into contact with the macerating disc 46 by which action the vegetables are shredded and the fibers and juices thus formed are thrown by centrifugal force against the inside of the rotary basket 38. The juices pass through the wall 42 and the fibers are retained thereagainst. There is a gradual build-up of a layer of fibers on the wall 42 and also some fibers are retained or caught by the teeth 48. These accumulations are not uniform in density and as the juicing operation proceeds there is developed an imbalance in the rotating parts in contact with the fibers, that is, the basket 38 and the macerator 46. At speeds of 2000 r.p.m. or faster any imbalance of these principal elements can disturb the rotational equilibrium of the device unless means are provided to counteract t..e disturbing influences.

Figure 2:
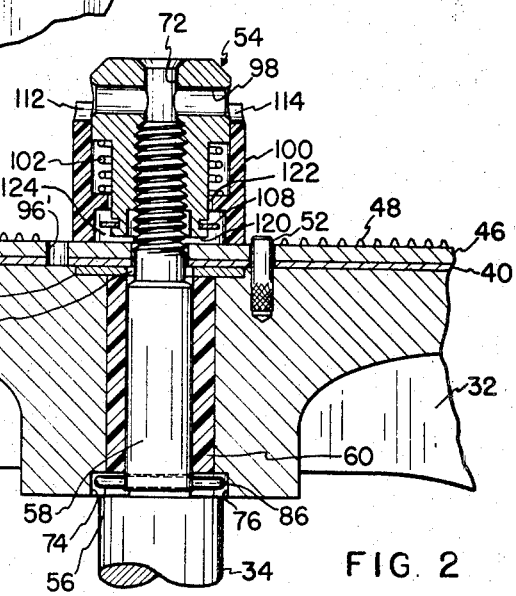
FIG. 2 is a partial sectional view enlarged, taken along lines 2—2 of FIG. 1.
Figure 3:
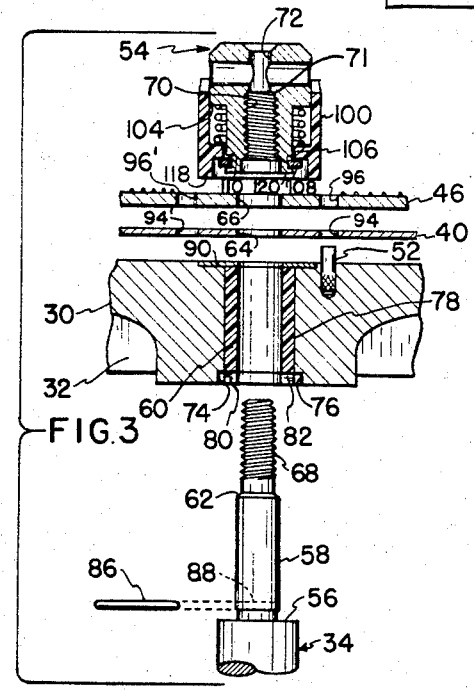
FIG. 3 is a partial sectional view of the parts shown in FIG. 2, reduced in size with the parts disassembled to show their relationship one to the other.

In accordance with this invention, means are provided for retaining the rotational equilibrium by automatically centering the new center of gravity created by the imbalance coincident with the center of shaft rotation. The details of the structures to accomplish these results are shown in FIGS. 2 and 3 wherein the drive shaft 34 is shown to have a weight bearing shoulder 56 adjacent the bottom of the centrifugal hub 30 with the spindle 58 extending therefrom through a pliable insert or sleeve 60. The spindle 58 terminates at a tapered off-set 62 and at the end of the shaft passes loosely through concentric bores 64 and 66 in the center of the bottom wall 40 of the basket 38 and the macerator disc 46, respectively. The shaft 34 has a terminal threaded portion 68 engageable with the threaded bore 70 in the cap member 54 and is retained in a locked position by the circumferential shoulder or stop 71. A central aperture 72 is provided in the top of the cap member to provide ease in cleaning this part.

The base of the hub 30 has opposing notches 74 and 76 communicating with the bore 78 encompassing the sleeve 60 and matching notches 80 and 82 are provided in the peripheral end of the sleeve 60. These pairs of notches are aligned to receive the ends of the shear pin 86 which passes through a transverse bore 88 in the base of the spindle 58. The sleeve 60 extends from the base of the hub, adjacent the shoulder 56 to retaining washer 90 which is press-fitted into a recess around the periphery of the longitudinal bore 78. As shown the retaining washer has its inner peripheral edge coincident with the end of the sleeve 60 and is spaced, as at 92, from the spindle 58 in a manner similar to the bores 64 and 66 of the bottom 40 and the macerator disc 46. This annular space 92 provides for limited radial movement of the hub 30 on the shaft 34. The hub 30 presents a flat upper surface upon which the bottom 40 rests and the bottom in turn supports the disc 46 to allow radial movement of these respective parts together with respect to the hub or with respect to one another.

The bottom 40 of the basket 38 and the macerator disc 46 have transverse apertures 94 and 96 which are substantially the same size and configuration and are located substantially the same radial distance from the centers of the bores 64 and 66 so as to be alignable one with the other and to loosely engage the pin 52 extending upwardly from and affixed to the hub 30. The pin 52 has essentially the same configuration as these apertures and is engageable therewith to drive these members with the hub 30 as it rotates. The apertures 94 and 96 are slightly larger than the pin 52 to allow slight radial movement of the driven elements and also for easy assembly. A second pair of matching apertures 94′ and 96′ also engageable with the pin 52 can be provided if desired to facilitate assembly.

The cap member 54 has a transverse bore 98 for the purpose of inserting a tool such as a pin wrench to aid in tightening and releasing the cap from its locked position on the threads 68. The bores 72 and 98 may or may not intersect. A plunger sleeve 100 encompasses and is slidably mounted on the body of the cap member and is held thereto in a downwardly biased position by means of the compression spring 102 held between the shoulder 104 and the internal flange 106. A C-ring or spring washer 108, which is engaged within a circumferential groove 110 at the base of the cap member, provides means for retaining the plunger sleeve 100 thereon by engagement with the bottom of the flange 106. The top peripheral edge of the plunger sleeve 100 has a pair of oppositely spaced notches 112 and 114 for alignment with the bore 98 to receive the pin wrench during disassembly.

As shown in FIGS. 2 and 3 with the cap member 54 removed, the lower flat peripheral edge 118 of the plunger sleeve 100 extends below the base 120 of the cap member and the C-ring 108 retains the sleeve thereon. An annular space 122 is provided between the flange 106 and the body of the cap member 54 and an annular space 124 is provided between the bottoms of these members. These spaces in combination with the bias of the spring 102 allow the sleeve 100 to move radially or resiliently cant slightly when imbalance occurs in the principal elements. It is also shown that upon disassembly the insert 60 is retained within the bore 78 and the hub 30.

When the shear pin 86 is inserted midway within the transverse bore 88, the hub 30 can be pressed down over the spindle 58 with the sleeve 60 encompassing the spindle 58. As the hub 30 is pressed into position the pin 86 registers with the aligned notches in the base of the hub and the peripheral end of the sleeve and floats therein. The tapered off-set 62 allows the spindle to be pressed within the sleeve 60. After placement of the basket and macerator thereon the cap member 54 is screwed upon the end of the shaft and tightened down until the threaded portion 68 of the shaft has been tightened to the end of the threaded bore 70 and locked or stopped thereby, in which position the base 120 is spaced from the top surface of the macerator 46 by about .050 to .070 inch and the lower peripheral edge 118 of the plunger sleeve 100 has been brought into engagement with the top surface of the macerator and is biased thereagainst by the spring 102. Thus, the base of the plunger sleeve 100 is radially movable in relation to the cap member and the cutter disc. A .060 inch clearance at the base 120 has been found to be enough to allow the cap member to function for purposes of this invention.

It is apparent that the foregoing construction allows the rotating elements to shift radially upon the shaft 34 under the yielding action of the pliable sleeve 60 while at the same time the cap member 54 readjusts and cants due to the frictional engagement of its lower edge 118 with the macerator 46 and also due to lateral or radial flexure of the plunger sleeve allowed by the spaces 122 and 124 between the base of the cap member and the plunger sleeve. The spaced relationship of the drive pin 52 and the spindle 58 from the macerator disc 46 allows it to cant slightly under the influence of an imbalance during high speed rotation.

The plunger sleeve 100 is preferably constructed of a tough plastic having good molding qualities, high tensile strength in the order of 5,000 to 13,000 p.s.i. (A.S.T.M., D 638, D 651), good flexural strength comparable to 8,000 to 14,000 p.s.i. (A.S.T.M., D 790) and a Rockwell hardness of about 100 to 120. Such plastics as nylon, polyvinyls, Teflon, polyethylene, urea-formaldehyde, methylmethacrylates, modified styrene, and polyacrylics may be used for purposes of forming the plunger sleeve 100.

The sleeve 60 is formed of a softer, more pliant and resilient plastic composition so that it will yield to the centrifugal forces incurred by the principal elements of the device and allow them to be self-centering. For this purpose such plastics as soft, flexible non-rigid vinyl chloride polymers and copolymers, vinyl chloride-acetate resins, rubber polyethylenes, and elastomeric types of plastics are used.

One skilled in this art will know that various monomers and elastomer compositions can be formulated with or without fillers and plasticizers to produce molded parts having the desired physical and chemical properties to be suitable for use as the sleeve 60 and the plunger sleeve 100 in accordance with this invention. The sleeve portions 60 can be cut from extruded plastic hose having the desired inside and outside diameters. The plunger sleeve 100 can be formed by compression or injection molding with or without machining to present a smooth bottom surface 118 and the proper internal dimensions and clearances, as at spaces 122 and 124, to function as a resilient mounting between the lead nut 54 and the top smooth surface of the macerating disc 46.

While the drawing discloses this invention in relation to a vegetable juicing machine, it is to be understood that this invention applies to any centrifugal device having a driving means and a driven means carrying a working member at a high rotational speed and adapted to do work upon a work piece or a material wherein conditions of imbalance in the principal moving parts occur. The stop member or pin 52 maintains a positive driving acton between the centrifugal hub 30 and the working member. Any means of attaching the hub with the working members can be used which provides a direct driving action between these members yet allows easy assembly and disassembly. The lead nut 54 can be hexagonal at the top to receive a box or open-end wrench for installing same instead of using a pin wrench. Also the lead nut 54 and plunger sleeve 100 need not be cylindrical in form and may be square, hexagonal, etc.

The device shown in the drawing is in scale with an embodiment in which the mass weights of the hub is 32 oz., the macerator disc 9 oz. and the basket is 22 oz. The relative movement permitted by the sleeve 60 is related to accommodate about a 1 oz. excess weight developing at one point on the periphery of the basket of a diameter of 7 inches. The speed of rotation is well above the oscillatory moment of the inertias involved at 7 inch diameter and are further dampened by the radial friction exerted by the sleeve 100. It is appreciated that with the weights mentioned for the parts noted the center of gravity of the rotating parts is only displaced a few thousandths of an inch. Although this is critical for undesirable vibration, the radial shift accomplished by the invention of the new center of gravity to coincide with the axis of rotation takes place progressively as needed with little if any vibration occurring and again restores itself when conditions are returned to normal as when the apparatus is cleaned. If there is an imbalance the macerator disc diametrically opposite thereto cants upwardly out of a plane perpendicular to the shaft due to the levering action of the locus of the imbalance on the vertical wall of the basket 38 being above the center of the resilient mounting 60, and with this imbalance-imposed elevation cuts deeper into the material in the chute opposite the locus of imbalance and immediately centrifugates the cuttings to the wall of the basket diametrically opposite the imbalance, thereby not only initially adjusting to prevent vibration, but also automatically remedying the imbalance.

Figure 4:
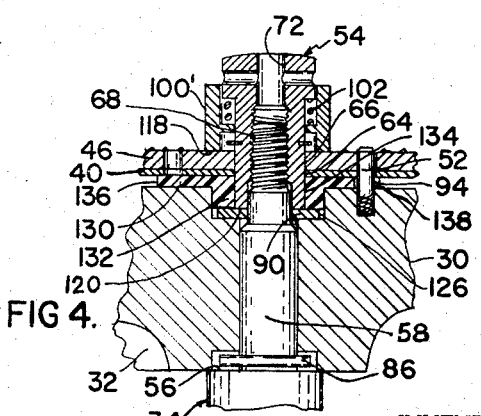
FIG. 4 is a partial sectional view similar to FIG. 2 showing a modification of this invention.

In FIG. 4 there is shown a modification of this invention to accomplish the foregoing results in a manner more directly related to basket and contents wherein the sleeve 60 can be omitted. The spindle 58 slidably fits within the bore 78 of the hub 30 with an annular clearance of about .01 to .005 inch. The top of the hub 30 has a deeper recess 126 adapted to receive the retaining washer 90. The inside circumference of the recess 126 is slightly larger than the outside circumference of the retaining washer 90. The bore 64 in the bottom 40 and the bore 66 in the macerator disc 46 are enlarged to receive bottom end of the cap member 54, which is elongated so that the base 120 thereof clamps upon the retaining washer 90. In this position the peripheral edge 118 of the plunger sleeve 100' is held against the top of the macerator disc 46 in the same manner as described in connection with FIGS. 2 and 3. The plunger sleeve 100' is preferably constructed of metal in this embodiment.

In the embodiment shown in FIG. 4 a resilient washer 130 is provided slightly compressed between the top of the hub 30 and the bottom 40 of the basket 38. The washer 130 is constructed of a pliant elastomer such as used for the sleeve 60, heretofore described, which it replaces. As shown in FIG. 4 the pliant washer 130 has an inner annular flange 132 which fits within the recess 126 and rests upon the top surface of the retaining washer 90. The inner bore 134 of the pliant washer 130 may fit snugly against the outer surface of the body of the cap 54 or may be spaced slightly therefrom. The outer edge 136 of the pliant washer 130 extends at least beyond the outer circumference of the plunger sleeve 100' and preferably into a position opposite the bores 94 and 96 which receive the drive pin 52, as illustrated, in which event a notch or hole 138 is provided in the periphery thereof to allow the pin 52 to pass therethrough. This construction and relationship of parts provides means whereby an imbalance of the macerator disc 46, the basket 38, or both, is automatically eliminated by allowing these parts to cant upwardly out of the normal plane of rotation at a point diametrically opposite the imbalance, or the resultant of two or more imbalances, and cut deeper into the material being treated, through the resilient supporting action of the pliant washer 130. The additional cuttings so formed by the canted position of the macerator disc 46 are immediately centrifuged to the wall of the basket 38 at this point opposite the imbalance, and in an amount proportional thereto, to continuously and automatically maintain conditions of dynamic equilibrium within the principal rotating parts and at the same time control the static balance.

The foregong description taken in connection with the accompanying drawings makes the construction and operation of the device of this invention apparent to one skilled in the art and changes in size, shape, proportion and details of construction may be made without departing from the spirit and scope of the appended claims.

What is claimed is:

1. In a centrifugal device having a driving means and a driven means rotatably carrying a working means at a high speed adapted to do work upon a work piece the combination of
    (a) means to provide limited radial and circumferential movement between said driven means and said working member,
    (b) resilient mounting means between said driving means and said driven means, and
    (c) means to resiliently hold said working means axially against said driven means whereby said working member is adapted to move relative to said driving means and said driven means under an imbalance of said working member.

2. A centrifugal device in accordance with claim 1 in which said resilient mounting means and said resilient holding means are adapted to allow said working means to cant out of the plane of rotation into deeper engagement with said work piece in a segment diametrically opposite the resultant of said imbalance.

3. A centrifugal device in accordance with claim 1 in which said resilient mounting means is axially spaced from the locus of imbalance on said working means.

4. A centrifugal device in accordance with claim 1 in which said working means includes a cutting member adapted to engage a stationary work piece and a catch basket adapted to centrifugally receive cuttings therefrom.

5. A centrifugal device in accordance with claim 1 in which said driving means comprises a rotatable shaft, said driven means comprises a centrifugal hub on said shaft, said hub having a radial surface carrying said working means, said resilient mounting comprises a pliable bushing between said shaft and said centrifugal hub, said pliable bushing being axially spaced from said working means and said means to resiliently hold said working means axially against said driven means comprises a cap member engaging the end of said shaft, said cap member having a base portion spaced from said working means, a tubular friction member supported by said cap member and biased against said working means.

6. A centrifugal device in accordance with claim 1 in which said driving means comprises a rotatable shaft, said driven means comprises a centrifugal hub on said shaft, said rub having a radial surface axially spaced from said working means, said resilient mounting comprises a pliable washer encompassing said shaft and compressed between said working means and the radial surface of said hub and said means to resiliently hold said working means axially against said driven means comprises a cap member engaging the end of said shaft, a tubular friction member supported by said cap member and biased against said working means, said cap member having a base portion extending through said working means and through said pliable washer against said centrifugal hub.

7. A centrifugal device in accordance with claim 6 in which said working means and said hub have substantially flat opposed spaced surfaces adjacent said shaft, said surface on said hub has an annular recess around said shaft and said pliable washer has an integral flange engaging said recess and contiguous to said base portion of said cap member.

8. A centrifugal device in accordance with claim 7 including a drive pin affixed between said substantially flat opposed spaced surfaces of said working means and said hub to provide limited radial and circumferential movement therebetween.

9. In a high speed machine adapted to macerate juice-containing fibrous materials, said machine having a vertical rotatable shaft, a centrifugal hub mounted on and adapted to rotate with said shaft, a perforated cylindrical-walled basket carried by said cylindrical hub and a fixed tube to introduce said fibrous materials therein the combination of
- a base plate in said basket,
- a cutter disc on said base plate,
- a drive pin affixed to said hub, said pin extending through and circumferentially spaced within aligned orifices in said base plate and cutter disc to provide limited radial and axial movement therebetween,
- a pliant plastic sleeve between said hub and said shaft,
- a cap member downwardly locked upon the end of said shaft and having a base member spaced from said cutter disc, and
- a tubular friction member supported by said cap member, said friction member having a flat frictional surface biased against said cutter disc, whereby to provide automatic compensation for imbalance in said basket and cutter due to uneven accumulations of macerated fibers thereon.

10. A high speed machine in accordance with claim 9 in which said shaft has a spindle supporting said hub, a circumferential shoulder at the end of said spindle, said shoulder being adjacent the bottom of an annular recess in said hub, said annular recess and shoulder supporting and encompassing said pliant sleeve, said pliant sleeve having an integral circumferential flange between said hub and said base plate, said flange extending radially beyond the periphery of said tubular friction member, whereby said cutter disc is adapted to cant out of its plane of rotation into deeper engagement with said fibrous materials in a segment diametrically opposite the resultant of said imbalance.

References Cited
UNITED STATES PATENTS

| | | |
|---|---|---|
| 392,583 | 11/1888 | Braun. |
| 2,305,193 | 12/1942 | Reynolds et al. _____ 146—3 X |
| 3,085,606 | 4/1963 | Moline _____ 146—3 X |
| 3,235,082 | 2/1966 | Compans _____ 210—144 X |

W. GRAYDON ABERCROMBIE, *Primary Examiner.*